Feb. 23, 1932.  P. F. SHIVERS  1,847,035
STACK THERMOSTAT
Filed Nov. 23, 1925  2 Sheets-Sheet 1
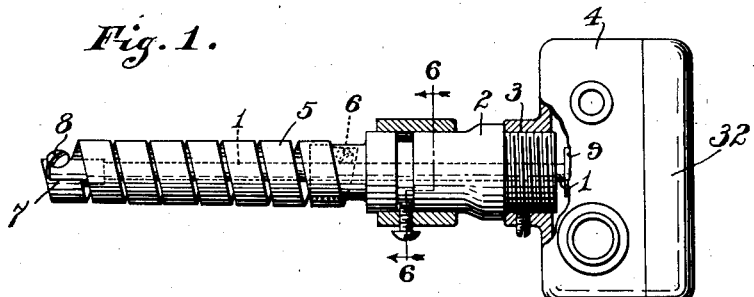
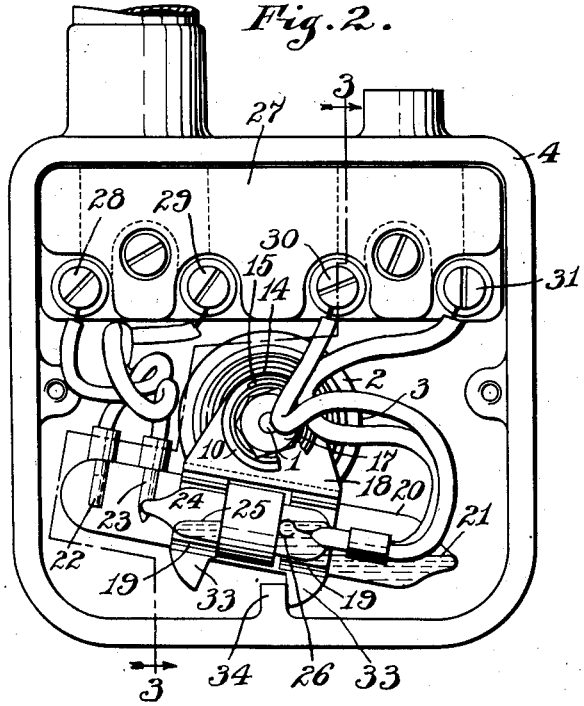
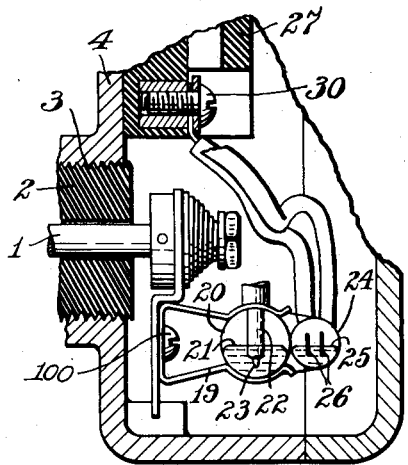
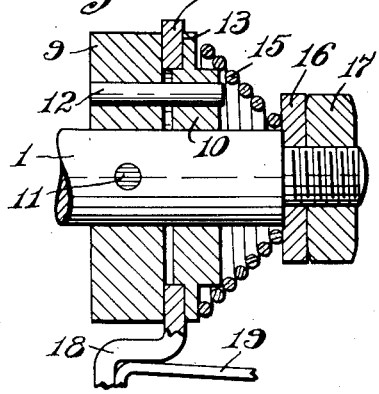
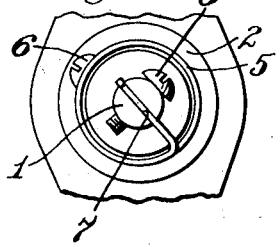
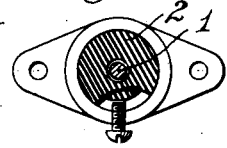
INVENTOR.
Paul F. Shivers,
BY
Hood + Hahn
ATTORNEYS Feb. 23, 1932.   P. F. SHIVERS   1,847,035
STACK THERMOSTAT
Filed Nov. 23, 1925   2 Sheets-Sheet 2
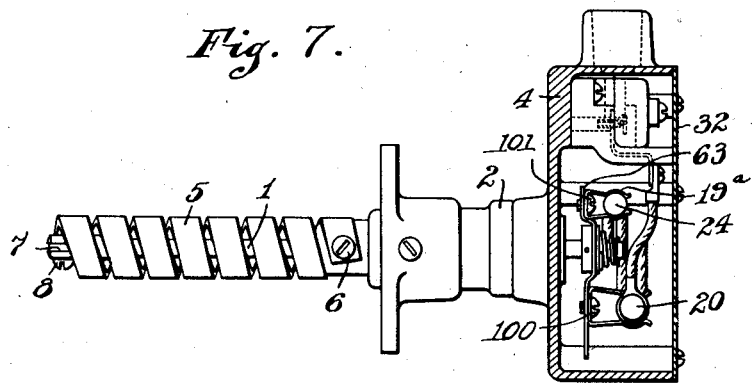
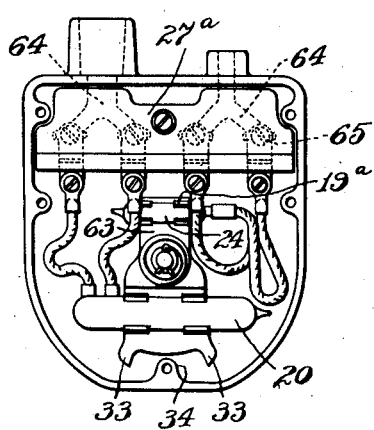
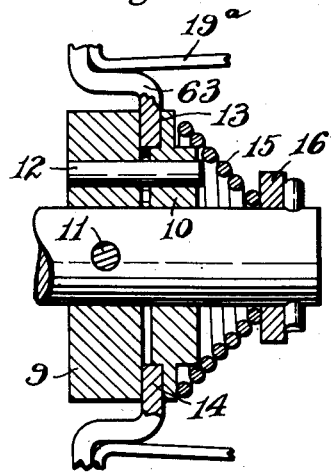
INVENTOR.
Paul F. Shivers,
BY
Hood + Hahn.
ATTORNEYS Patented Feb. 23, 1932

1,847,035

UNITED STATES PATENT OFFICE

PAUL F. SHIVERS, OF WABASH, INDIANA, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

STACK THERMOSTAT

Application filed November 23, 1925. Serial No. 70,808.

My invention relates to thermostatically operated switches for controlling the circuit through various electrical devices such for instance as electric motors for operating oil burning apparatus for heating and other boilers, furnaces and the like.

One of the objects of my invention is to provide a thermostatic operating device for said switches in which there shall be no lag in the operation of the switches when the thermostatic element responds to changes in temperature to move the switches in one direction or the other.

Another object of my invention is to provide in a thermostatically controlled switch means whereby a continued movement of the thermostat under temperature conditions, after having completed the operation of the switch will not affect or injure the switch.

A further object of my invention is to provide a thermostatically operated switch wherein even though the thermostatic element continues its movement under the influence of temperature conditions, after having manipulated the switch a reversal of movement under a change of temperature conditions will immediately cause the operation of the switch.

For the purpose of disclosing my invention I have illustrated certain embodiments thereof in the accompanying drawings in which Fig. 1 is a plan of a thermostatic device embodying my invention;

Fig. 2 is a front elevation thereof with the casing cover plate removed;

Fig. 3 is a detail section taken on the line 3—3 of Fig. 2;

Fig. 4 is a detail section of the manner of connecting the switching mechanism with the driving spindle;

Fig. 5 is a rear end elevation;

Fig. 6 is a detail section on the line 6—6 of Fig. 1;

Fig. 7 is an elevation partly in section of still another form of my invention;

Fig. 8 is a front elevation with the casing cover removed, and

Fig. 9 is a detail section of the driving connection between the switch elements and the driving spindle.

In the structure illustrated, having reference first to Figs. 1 to 6 inclusive, I provide a rotating spindle 1, one end of which is mounted to rotate in a suitable bearing 2 formed of heat insulating material and threaded into a socket 3 in the back of a casing 4. One end of this spindle 1 projects through the insulating bearing 2 and into the casing. The exposed portion of the spindle is surrounded by a helical ribbon coil 5 one end of which is secured at 6 to the insulating bearing member 2 and held thereby against movement. The opposite end of the ribbon 5 is secured in a slot 7 in the exposed end of the spindle 1 by means of a clamping screw 8. This coil 5 is formed of any suitable thermostatic material, preferably of metal structure, which will expand and contract under variations in temperature, preferably expanding under the influence of heat and contracting under the influence of cold. Therefore, due to the construction of the thermostatic element 5 in the structure illustrated, when the coil is subjected to heat it will tend to rotate the spindle 1 in one direction and when the temperature begins to lower will rotate the spindle in the opposite direction.

The spindle 1, at its forward end which projects into the casing 4, is provided with a friction clutch comprising the two discs 9 and 10. The disc 9 is secured by means of the pin 11 to the spindle 1 so that it will rotate therewith and the disc 10 is axially slidably mounted on pin 12 projecting from the disc 9 and entering a hole in the disc 10. This disc 10 is provided on one side with a shouldered face 13 between which and the face of the disc 9 operates the driven member of the clutch, which member takes the form of a ring 14. For holding the clutch member 14 in frictional contact with the discs 9 and 10 I provide a conical coiled spring 15 surrounding the end of the spindle 1 and seating at one end on the disc 10 and at its opposite end against a washer 16 held in position by a nut 17 screwed on the end of the spindle 1. The clutch member 14 also comprises an operating device for the switch mechanism and in the structures illustrated in Figs. 1 to 6 supports and carries the switching mechanism. To this end this clutch member is provided with an extension plate 18 having secured on the face of it a U shaped clip 19 adapted to support and operate a pair of mercury contact switches. One of the switches comprises a sealed glass tube 20 in which is arranged a supply of mercury 21 and into which is projected at one end a pair of contacts 22 and 23. The other switch member, like the switch member 20, comprises a glass tube 24 likewise supplied with mercury 25 and having projecting therein suitable contacts 26. These contacts 26 are mounted in the end of the tube 24 extending away from the end of the tube 20 carrying contacts 22 and 23.

Mounted within the casing 4 is a terminal block 27 of insulating material and carrying a pair of terminal binding posts 28 and 29 connected respectively by pig tails with the contacts 22 and 23. A second pair of terminal binding posts 30 and 31 are mounted on the terminal block 27 which binding posts are connected respectively by pig tails with the contacts 26. Suitable conductor leads may be taken off from the binding posts through openings in the casing and the casing is provided with a cover 32 for closing the same and protecting the parts against injury.

It is apparent that when the tubes 20 and 24 are tilted due to the rocking of the carrier 18 the mercury will be caused to flow from one end of the tube to the other and that when the tubes are rocked so that the mercury in the tube 20 flows to bridge the contacts 22 and 23 the mercury in the tube 24 which bridges the contacts 26 will flow away from these contacts so that when the circuit is closed through one set of contacts it will be opened through the opposite set.

In order to prevent excessive movement on the part of the carrier 18 the lower end of this carrier is provided with spaced apart ears 33 adapted to engage with a stop 34 formed on the casing.

It is obvious that when the spindle is rotated under the influence of the expansion of the thermostatic element 5 the carrier 18 will be rocked with the spindle due to the friction drive until one of the ears 33 engages the stop 34 and the mercury will be caused to flow in the tube from one end to the other. Due to the friction drive between the spindle and the rocker support 18 a continued rotation of the spindle under the influence of continued expansion of the thermostatic element 5 will not affect the movement of the switch member nor will the parts be distorted or destroyed. As soon, however, as the movement of the spindle reverses under the contraction of the thermostatic element due to a lowering of the temperature, the member 18 will immediately commence to move in a reverse direction rocking the switch tubes in an opposite direction to cause a reversal of the contacts. It is thus seen that all lag is eliminated from the operation of the switches and that no matter how far the thermostatic element has been moved in one direction the switches will instantly respond as soon as the movement of the thermostatic element is reversed, due to a change in temperature, in the other direction.

The structure illustrated in Figs. 7 to 9 is very similar to that shown in Figs. 1 to 6. In this structure, however, the rocker arm 18 only carries on its lower side one mercury tube switch 20 and is provided with an upwardly extending support 63 provided with clips 19a, similar to clips 19, which carry the other mercury tube switch 24. In this construction the terminal block 27a is provided with diverging conduits 64 for the lead-in wires which are connected to suitable terminals 65 mounted in these conduits so that the parts will be more thoroughly insulated from one another.

The clip 19 is conveniently attached to the element 14—18 (Figs. 3 and 7) by a screw 100 by means of which it may be frictionally clamped in position, said clip being thus angularly adjustable on its carrier. The clip 19a is similarly secured to the element 14—63 (Fig. 7) by a single screw 101, the arrangement being such that the mercury tube contactors held by the clips may be relatively angularly adjustable.

I claim as my invention:

1. A thermostat comprising a main body, a shaft journaled in said body, a thermostatic element anchored upon said main body and connected to the shaft to rotate the same upon change of temperature, two friction collars mounted upon the shaft to rotate therewith, one axially movable relative to the other, a plate rotatably associated with the shaft between said friction collars, means carried by the main body for limiting movement of the plate relative to the main body about the axis of the shaft, a holder for a mercury tube contactor, a clamping screw adjustably connecting said holder with the plate, and a mercury tube contactor mounted in said holder transversely of the axis of the shaft.

2. A thermostat comprising a main body, a shaft journaled in said body, a thermostatic element of the helical type anchored upon said main body co-axial with the shaft and connected to the shaft to rotate the same upon change of temperature, two friction collars mounted upon the shaft to rotate therewith, one axially movable relative to the other, a plate rotatably associated with the shaft between said friction collars, means carried by the main body for limiting movement of the plate relative to the main body about the axis of the shaft, a holder for a mercury tube contactor, a clamping screw adjustably connecting said holder with the plate, and a mercury tube contactor mounted in said holder transversely of the axis of the shaft.

3. A thermostat comprising a main body, a shaft journaled in said body, a thermostatic element anchored upon said main body and connected to the shaft to rotate the same upon change of temperature, two friction collars mounted upon the shaft to rotate therewith, one axially movable relative to the other, a plate rotatably associated with the shaft between said friction collars, means carried by the main body for limiting movement of the plate relative to the main body about the axis of the shaft, a holder for a mercury tube contactor, a clamping screw adjustably connecting said holder with the plate, a mercury tube contactor mounted in said holder transversely of the axis of the shaft, a second holder for mercury tube contactor, a second clamping screw adjustably clamping said second holder to said plate, and a second mercury tube contactor mounted in said second holder.

4. A thermostat comprising a main body, a shaft journaled in said body, a thermostatic element of the helical type anchored upon said main body co-axial with the shaft and connected to the shaft to rotate the same upon change of temperature, two friction collars mounted upon the shaft to rotate therewith, one axially movable relative to the other, a plate rotatably associated with the shaft between said friction collars, means carried by the main body for limiting movement of the plate relative to the main body about the axis of the shaft, a holder for a mercury tube contactor, a clamping screw adjustably connecting said holder with the plate, a mercury tube contactor mounted in said holder transversely of the axis of the shaft, a second holder for mercury tube contactor, a second clamping screw adjustably clamping said second holder to said plate, and a second mercury tube contactor mounted in said second holder.

5. In a device of the character described, a pivotally mounted actuator, a pair of mercury tube contactors adjustably mounted thereon on opposite sides of the pivotal mounting therefor to effect a double throw switch whereby a partial rotation of said actuator tilts said contactors to cause a change of circuit connections therethrough.

6. In a device of the character described, a rotatable shaft, an arm mounted on and rotatable with said shaft, a pair of mercury tube contactors adjustably mounted on said arm to effect a double throw switch, said contactors being disposed on opposite sides of the axis of said shaft, said shaft operating to cause a change of circuit connections through said contactors.

7. In a device of the character described, an actuating shaft, an arm mounted to tilt with said shaft, and a plurality of mercury tube contactors pivotally adjustable on said arm to effect a double throw switch, said contactors being pivotal in the direction of pivotal movement of said arm.

8. In a device of the character described, an actuating shaft, an arm mounted on to tilt with said shaft, said arm extending at a substantially right angle to said shaft, and a plurality of mercury tube contactors pivotally adjustable on said arm to effect a double throw switch, said contactors being pivoted about axes extending substantially parallel with the axis of said actuating shaft.

9. In a device of the character described, an actuating shaft, an arm frictionally held on said shaft to move therewith, and a pair of mercury tube contactors pivotally adjustable on said arm to determine the change of circuit connections relatively to each other, said contactors including a pair of spaced cooperating electrodes and a body of current-conducting fluid and said electrodes being disposed on opposite ends of their respective tubes.

10. In a device of the character described, a pivotally mounted actuator, and a pair of mercury tube contactors adjustably mounted thereon on opposite sides of the pivotal mounting therefor to determine the change of circuit connections relatively to each other, said contactors including a pair of spaced cooperating electrodes and a body of current-conducting fluid and said electrodes being disposed on opposite ends of their respective tubes.

In witness whereof, I, PAUL F. SHIVERS, have hereunto set my hand at Wabash, Indiana, this 6th day of November, A. D. one thousand nine hundred and twenty-five.

PAUL F. SHIVERS.